United States Patent
Jang et al.

(10) Patent No.: US 10,482,360 B2
(45) Date of Patent: Nov. 19, 2019

(54) METHOD FOR IMPROVING HYBRID HALFTONING AND APPARATUS THEREFOR

(71) Applicant: Samsung Electronics Co., Ltd., Gyeonggi-do (KR)

(72) Inventors: Seul-ki Jang, Gyeonggi-do (KR); Ji-young Yi, Gyeonggi-do (KR)

(73) Assignee: Samsung Electronics Co.,, Ltd (KR)

( * ) Notice: Subject to any disclaimer, the term of this patent is extended or adjusted under 35 U.S.C. 154(b) by 0 days.

(21) Appl. No.: 15/551,825

(22) PCT Filed: Dec. 8, 2015

(86) PCT No.: PCT/KR2015/013401
§ 371 (c)(1),
(2) Date: Aug. 17, 2017

(87) PCT Pub. No.: WO2016/133275
PCT Pub. Date: Aug. 25, 2016

(65) Prior Publication Data
US 2018/0039871 A1 Feb. 8, 2018

(30) Foreign Application Priority Data
Feb. 17, 2015 (KR) ........................ 10-2015-0024017

(51) Int. Cl.
*G06K 15/02* (2006.01)
*H04N 1/58* (2006.01)
(Continued)

(52) U.S. Cl.
CPC ....... *G06K 15/1881* (2013.01); *G06K 9/4652* (2013.01); *H04N 1/4052* (2013.01);
(Continued)

(58) Field of Classification Search
CPC ............ G06K 15/1881; G06K 9/4652; G06K 2215/0094; H04N 1/4052; H04N 1/4092;
(Continued)

(56) References Cited

U.S. PATENT DOCUMENTS

| 6,178,011 B1 | 1/2001 | Lin et al. |
| 7,619,777 B2 | 11/2009 | Lee et al. |

(Continued)

FOREIGN PATENT DOCUMENTS

| JP | 4241441 | 3/2009 |
| KR | 10-0648928 | 11/2006 |

(Continued)

OTHER PUBLICATIONS

Information Technology—Office Equipment—Measurement of Image Quality Attributes for Hardcopy Output—Binary Monochrome Text and Graphic Images; ISO/IEC 13660, International Standard, First Edition, Sep. 1, 2001, 9 pages.

(Continued)

*Primary Examiner* — Quang N Vo
(74) *Attorney, Agent, or Firm* — The Farrell Law Firm, P.C.

(57) ABSTRACT

Provided is a method by which an image forming apparatus forms an image, the method including detecting a boundary area in a portion of image data; determining a direction of the boundary area, a dominant color of the boundary area, and an edge intensity of the boundary area; determining enhancement information with respect to the boundary area based on the direction, the dominant color, and the edge intensity; and forming an image with respect to the image data based on the determined enhancement information.

15 Claims, 15 Drawing Sheets

(51) Int. Cl.
  *G06K 9/46* (2006.01)
  *H04N 1/409* (2006.01)
  *G06F 3/12* (2006.01)
  *H04N 1/405* (2006.01)

(52) U.S. Cl.
  CPC ............. *H04N 1/4092* (2013.01); *H04N 1/58* (2013.01); *G06F 3/1208* (2013.01); *G06K 2215/0094* (2013.01)

(58) Field of Classification Search
  CPC .......... H04N 1/52; H04N 1/58; G06F 3/1208; G06F 3/1247
  USPC ........................................ 358/3.06, 1.9, 1.15
  See application file for complete search history.

(56) References Cited

U.S. PATENT DOCUMENTS

| | | |
|---|---|---|
| 8,120,817 B2 | 2/2012 | Lee |
| 8,848,249 B2 | 9/2014 | Park et al. |
| 2003/0108237 A1* | 6/2003 | Hirata .................... G06K 9/342 382/164 |
| 2006/0023258 A1 | 2/2006 | Loce et al. |
| 2006/0077468 A1 | 4/2006 | Loce et al. |
| 2008/0018938 A1* | 1/2008 | Lee ...................... H04N 1/4055 358/3.06 |
| 2009/0010562 A1 | 1/2009 | Chung |
| 2015/0085320 A1* | 3/2015 | Palanivel .............. G06F 3/1208 358/2.1 |

FOREIGN PATENT DOCUMENTS

| | | |
|---|---|---|
| KR | 1020080006112 | 1/2008 |
| KR | 1020090004409 | 1/2009 |
| KR | 1020090093603 | 9/2009 |

OTHER PUBLICATIONS

International Search Report dated Apr. 14, 2016 issued in counterpart application No. PCT/KR2015/013401, 24 pages.
Korean Office Action dated May 29, 2019 issued in counterpart application No. 10-2015-0024017, 9 pages.

* cited by examiner

FIG. 1
(a) 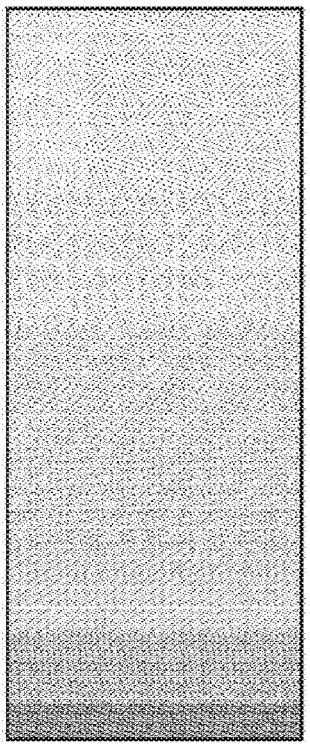
Contone
(b) 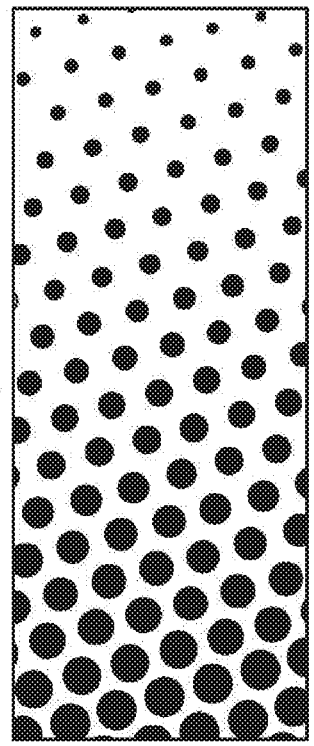
Halftone
ADJUST TONE WITH SIZES OR DISTRIBUTION OF DOTS

METHOD FOR IMPROVING HYBRID HALFTONING AND APPARATUS THEREFOR

PRIORITY

This application is a National Phase Entry of PCT International Application No. PCT/KR2015/013401, which was filed on Dec. 8, 2015, and claims priority to Korean Patent Application No. 10-2015-0024017, which was filed on Feb. 17, 2015, the contents of each of which are incorporated herein by reference.

TECHNICAL FIELD

The present invention relates to a method of enhancing image quality when an image forming apparatus forms an image, and more particularly, to a method of enhancing half-toning for expressing tones of an image.

BACKGROUND ART

Image forming apparatuses, such as printers and multi-function printers (MFP), use various image quality enhancing methods in order to print a printed material in a substantially same form as that of print data. Along with developments in scientific technologies, there is demand for high-quality printing due to increases in the capacity of data to be printed, and thus high-density printing methods and related field techniques are being developed to obtain high quality printed materials.

Meanwhile, a half-toning method may be used to accurately reproduce a tone at a boundary of a contiguous tone image in a printed material printed from a printing device.

DETAILED DESCRIPTION OF THE INVENTION

Technical Problem

According to an aspect of the present invention, there is provided a method by which an image forming apparatus forms an image, the method including detecting a boundary area in a portion of image data; determining a direction of the boundary area, a dominant color of the boundary area, and an edge intensity of the boundary area; determining enhancement information regarding the boundary area based on the direction, the dominant color, and the edge intensity; and forming an image regarding the image data based on the determined enhancement information.

The boundary area may be a boundary area between two areas to which different half-toning methods are applied.

The direction of the boundary area may be information expressible as a 2-dimensional vector in the portion of the image data.

The dominant color of the boundary area may be determined from information regarding one or more colors of the boundary area based on a pre-set equation.

Preferably, the information regarding the one or more colors may be defined in a CMYK color space.

The edge intensity of the boundary area may vary according to concentrations of the one or more colors of the boundary area.

The boundary area may be a boundary area between an error diffusion area and a screening area.

Preferably, the error diffusion area may be an area for expressing detail information, and the screening area may be an area for expressing information other than the detail information.

The enhancement information regarding the boundary area may include at least one selected from the group of a color and a concentration regarding a line formed in the boundary area.

Preferably, information regarding the concentration of the line formed in the boundary area may be determined based on the number of dots per inch or sizes of the dots.

According to an aspect of the present invention, there is provided an image forming apparatus including a network interface that receives data related to user format document from the outside; a memory that stores data regarding the received user format document; a control unit; and a printing module that prints the user format document based on determined enhancement information, wherein the control unit is configured to detect a boundary area in a portion of image data, determine a direction of the boundary area, a dominant color of the boundary area, and edge intensity of the boundary area, and determine enhancement information regarding the boundary area based on the direction, the dominant color, and the edge intensity.

Advantageous Effects of the Invention

A method of effectively reducing a step or raggedness in an area in which heterogeneous half-toning techniques intersect is provided.

DESCRIPTION OF THE DRAWINGS

FIG. 1 is a diagram showing a half-toning method according to an embodiment of the present invention.

BEST MODE

Figure 2:
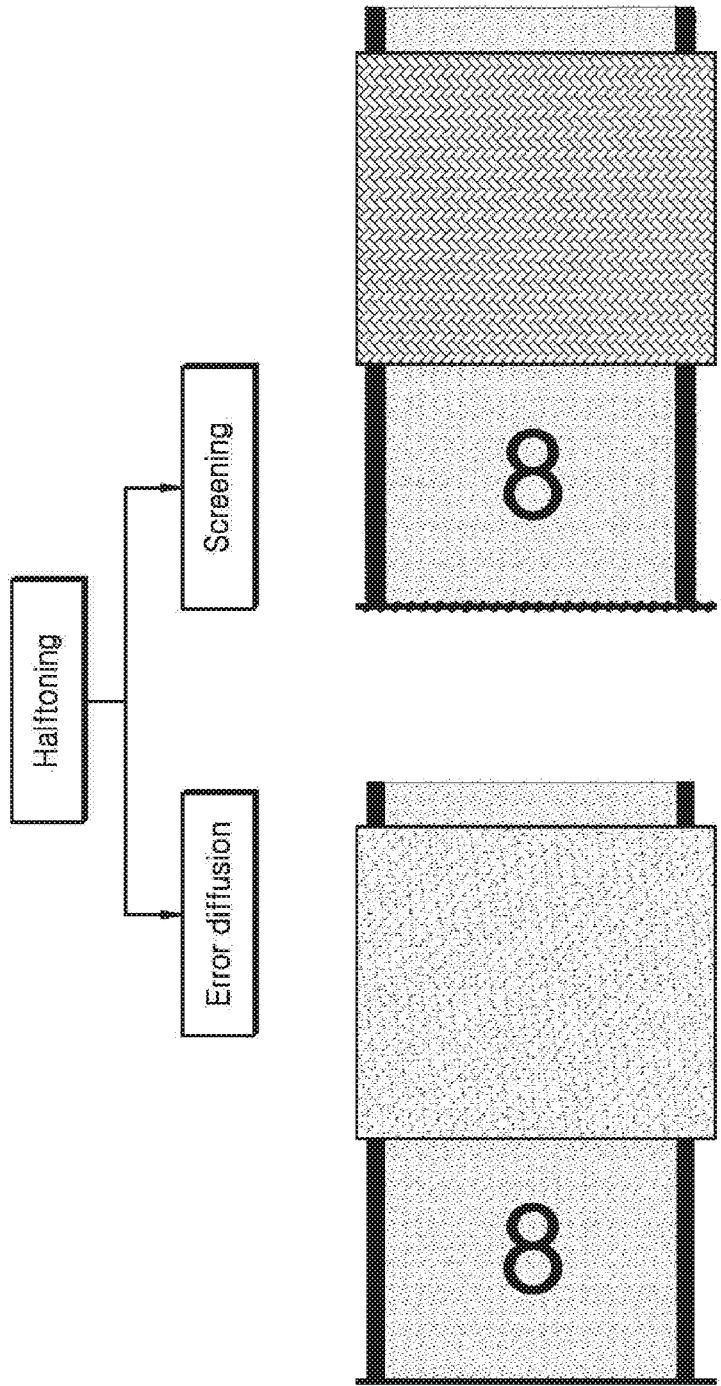
FIG. 2 is a diagram showing classification of half-toning methods according to an embodiment of the present invention and images to which the half-toning methods are applied.

According to an aspect of the present invention, there is provided a method by which an image forming apparatus forms an image, the method including detecting a boundary area in a portion of image data; determining a direction of the boundary area, a dominant color of the boundary area, and an edge intensity of the boundary area; determining enhancement information regarding the boundary area based on the direction, the dominant color, and the edge intensity; and forming an image regarding the image data based on the determined enhancement information.

According to an aspect of the present invention, there is provided an image forming apparatus including a network interface that receives data related to a user format document from the outside; a memory that stores data regarding the received user format document; a control unit; and a printing module that prints the user format document based on determined enhancement information, wherein the control unit is configured to detect a boundary area in a portion of image data, determine a direction of the boundary area, a dominant color of the boundary area, and an edge intensity of the boundary area, and determine enhancement information regarding the boundary area based on the direction, the dominant color, and the edge intensity.

MODE OF THE INVENTION

Hereinafter, the present invention will be described in detail with reference to the accompanying drawings, but the present invention is not limited thereto. It should be understood that the following examples of the present invention are for the purpose of illustrating the present invention and do not limit the scope of the present invention. It will be understood by those of ordinary skill in the art that various changes in form and details may be made therein without departing from the spirit and scope of the invention as defined by the appended claims.

Embodiments of the present disclosure relate to a method of enhancing hybrid half-toning and an image forming apparatus using the same. Hereinafter, detailed descriptions of technical features that are widely known to one of ordinary skill in the art will be omitted.

FIG. 1 is a diagram showing a half-toning method according to an embodiment of the present invention.

Digital half-toning refers to a method of approximating a continuous tone image to a binary image for a printer or a multifunctional printer capable of handling only black and white binary images.

According to processing methods, the digital half-toning method may be classified into a point processing method taking only a given pixel value into account and an area processing method that is determined according to surrounding pixel values. Dithering (or screening) corresponds to a point processing method and refers to a method of comparing a given pixel value and a predetermined threshold value and printing only when the pixel value is smaller than the threshold value.

On the contrary, an error diffusion method is an area diffusion method for propagating an error generated by binarization of a given pixel to surrounding pixels and taking such propagated errors into account for binarizing surrounding pixels.

As shown in FIG. 1, the image shown in (a) of FIG. 1 is an image output in continuous tone (may also be referred to as contone) by adjusting a single tone and continuously expressing the same.

The image shown in (b) of FIG. 1 shows an expression of a halftone and shows a case of adjusting tone by using sizes or distribution of dots. A dark tone may be expressed by densely distributing relatively large dots and a bright tone may be expressed by lightly distributing relatively small dots, thereby adjusting tone.

FIG. 2 is a diagram showing classification of half-toning methods according to an embodiment of the present invention and images to which the half-toning methods are applied.

Dithering (also referred to as screening) is advantageous for smoothly expressing flat portions of an image, whereas error diffusion is advantageous for expressing details of an image, such as texts. A hybrid half-toning method is a technique having combined advantages of the dithering and the error diffusion.

However, the hybrid half-toning method has a problem of causing a step or raggedness at a boundary area where different half-tones intersect each other. Therefore, the present disclosure proposes a method of reducing a step or raggedness at a boundary area.

Figure 3:
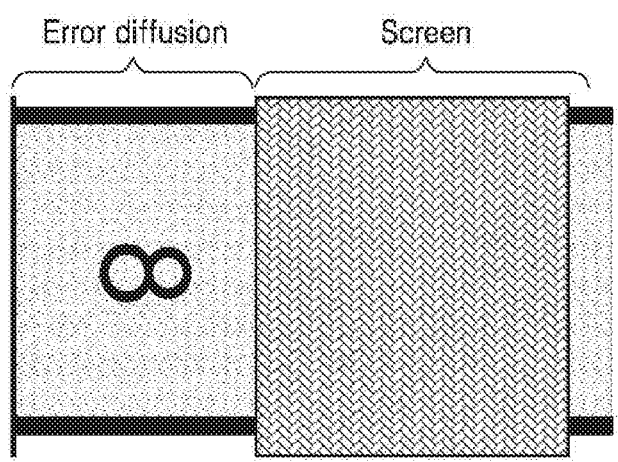
FIG. 3 is a diagram showing a hybrid half-toning method according to an embodiment of the present invention.

FIG. 3 is a diagram showing a hybrid half-toning method according to an embodiment of the present invention.

As shown in FIG. 3, a step or raggedness may occur at a boundary area to which error diffusion is applied and an area where dithering (also referred to as screening) is applied. The raggedness refers to a phenomenon whereby an image jiggles at a boundary area.

In the case of a hybrid half-toning method, image processing at a boundary area becomes important during the process of combining and outputting heterogeneous half-toning methods and may also be applied as an important parameter for evaluating image quality. Therefore, it is necessary to determine a boundary area in entire output image data and determine enhancement information regarding the determined boundary area.

Figure 4:
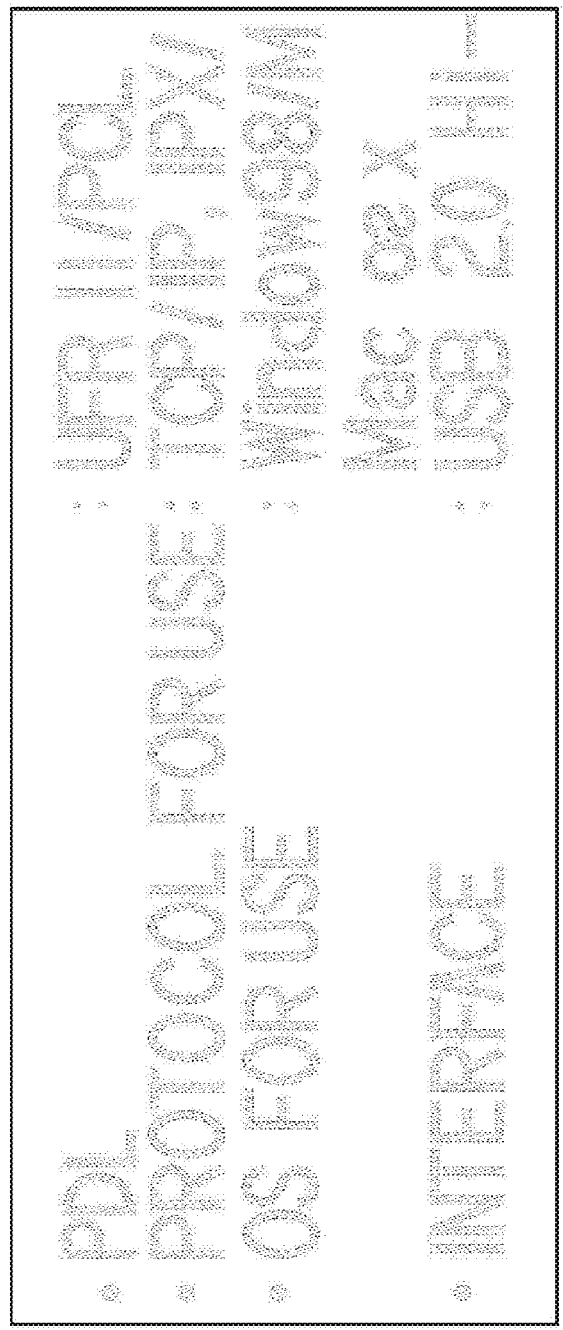
FIG. 4 is an output image to which a hybrid half-toning method according to an embodiment of the present invention is applied.

FIG. 4 is an output image to which a hybrid half-toning method according to an embodiment of the present invention is applied.

FIG. 4 is an image output by using a hybrid half-toning method to which dithering and error diffusion are applied without reflecting additional enhancement information with respect to a boundary area in a portion of image data. As shown in FIG. 4, raggedness may occur between an area displayed as a text and a flat portion corresponding to the background of the text, and thus legibility and visibility may be deteriorated. In particular, such raggedness may deteriorate legibility or visibility of a small-sized text or an image to be expressed in detail. Therefore, an additional process for enhancing and expressing a boundary area to which a hybrid half-toning method is applied is required.

Figure 5:
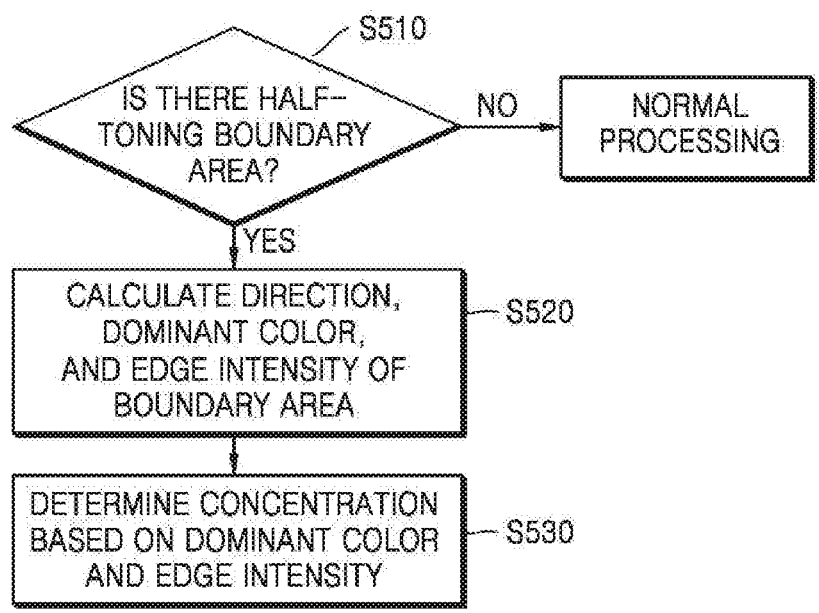
FIG. 5 is a flowchart of a hybrid half-toning method according to an embodiment of the present invention.

FIG. 5 is a flowchart of a hybrid half-toning method according to an embodiment of the present invention.

In operation S510, a control unit may determine a boundary area that is formed as a hybrid half-toning method is applied to image data. For example, as shown in FIG. 4, different half-toning methods may be applied to an area in which a text is displayed and an area in which the background of the text is displayed, respectively. Error diffusion may be applied to the area where the text is displayed, whereas dithering may be applied to the area where the background of the text is displayed.

In operation S520, the control unit may obtain information regarding the boundary area. A direction, a dominant color, and an edge intensity of the boundary area may be calculated.

In operation S530, the control unit may determine an amount of enhancement based on the obtained information regarding the boundary area. The amount of enhancement may be with respect to a direction, a dominant color, and an edge intensity, and a density of dots according to the amount of enhancement may be determined. The control unit may form an image of the boundary area with respect to the image data, based on the determined amount of enhancement.

Figure 6:
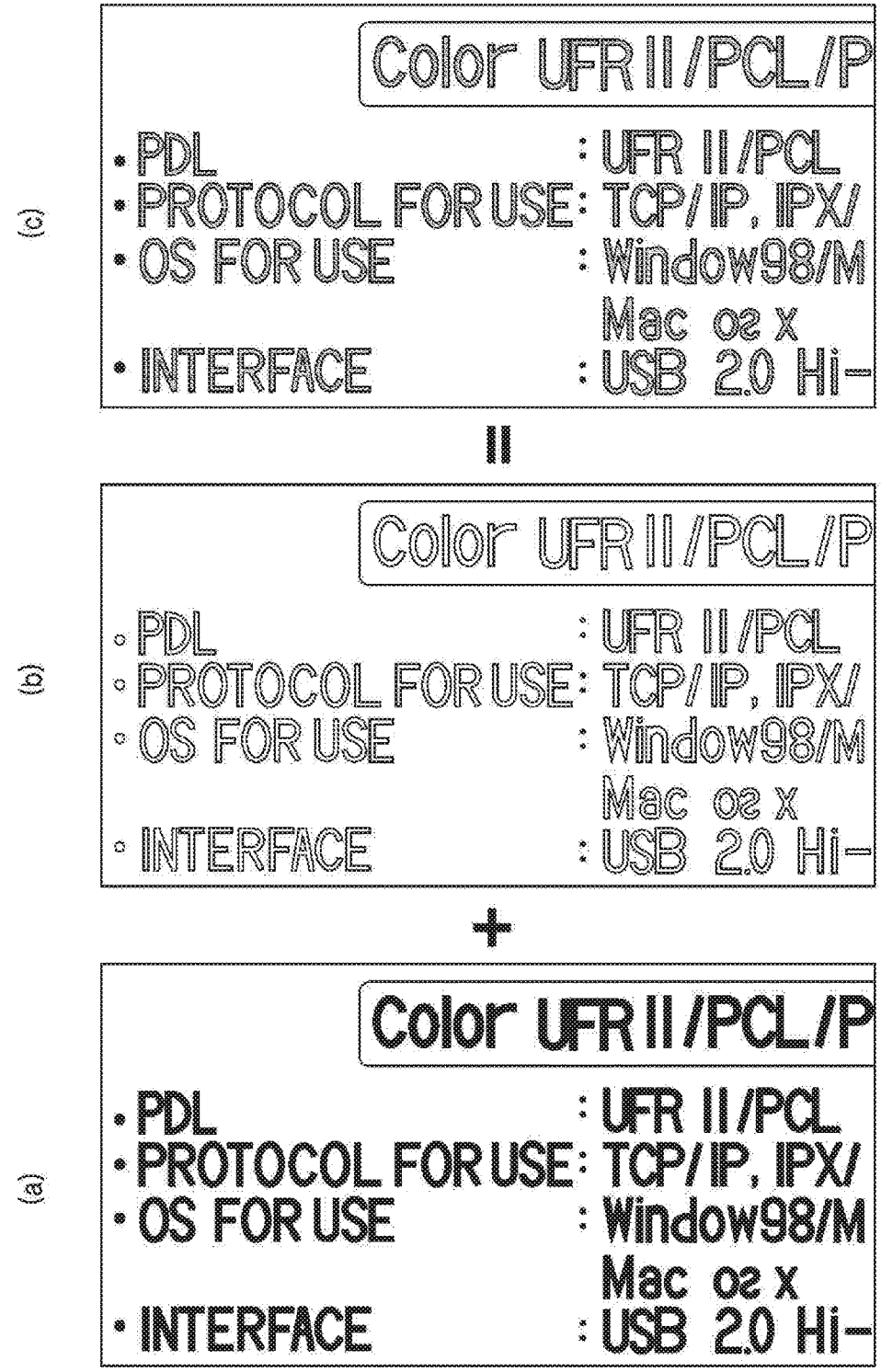
FIG. 6 is an enhanced output image to which a hybrid half-toning method according to an embodiment of the present invention is applied.

FIG. 6 is an enhanced output image to which a hybrid half-toning method according to an embodiment of the present invention is applied.

As shown in FIG. 6, for application of a hybrid half-toning method, it is necessary to process at a boundary area where two methods intersect with each other. (a) of FIG. 6 is an image obtained by simply combining two half-toning methods, that is error diffusion and dithering.

As shown in (b of FIG. 6, the control unit may detect a boundary area. When image data relates to texts or images of various types, boundary areas may be distributed in a plurality of areas. At a boundary area, values regarding a direction, a dominant color, and an edge intensity are detected and amounts of enhancement related thereto are determined, thereby adjusting lines and density at the boundary area.

As shown in (c) of FIG. 6, it may be seen that a step or raggedness is reduced at a boundary area by applying an amount of enhancement as compared to a case in which hybrid half-toning is simply applied.

Figure 7:
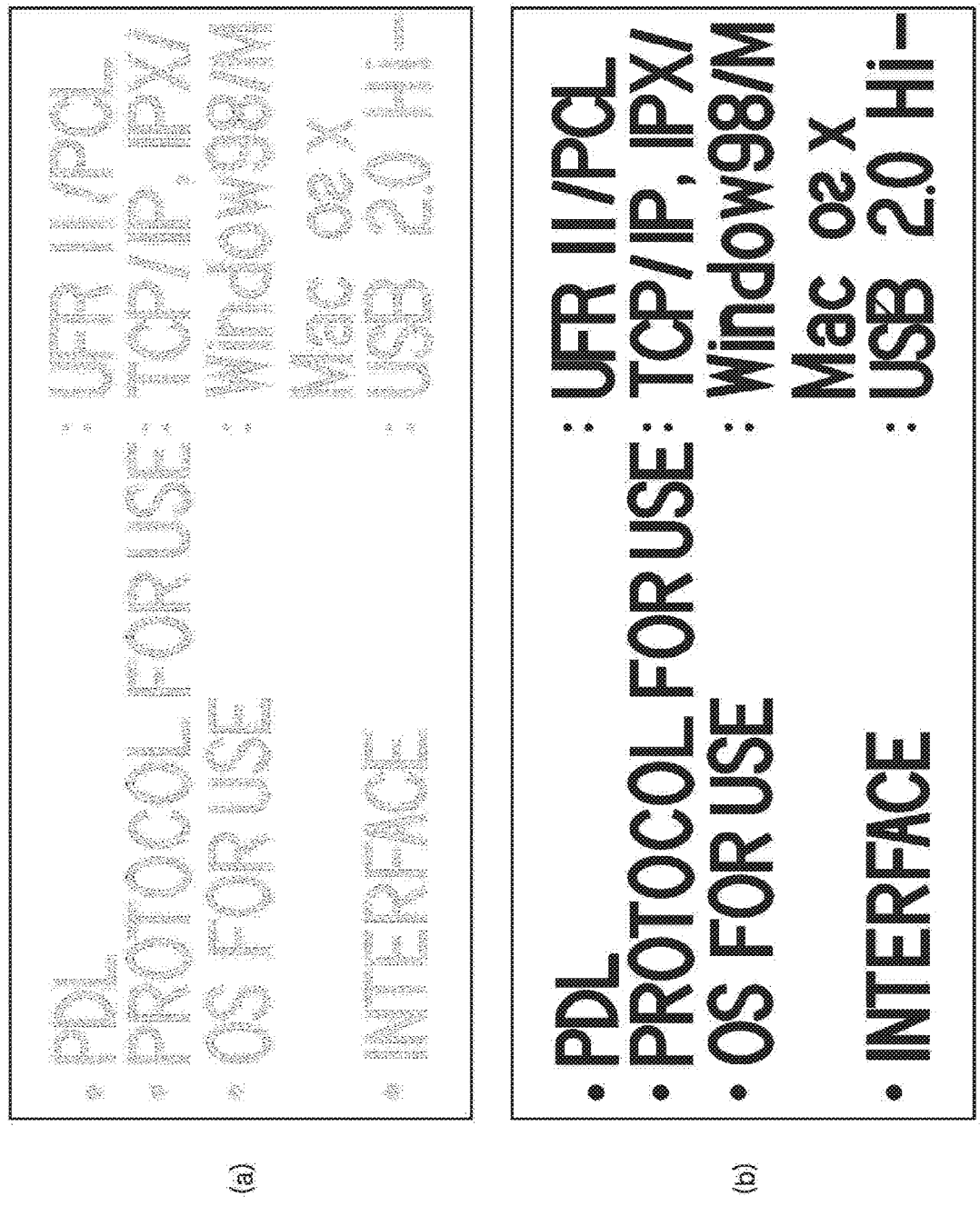
FIG. 7 is an output image before and after a hybrid half-toning method according to an embodiment of the present invention is applied.

FIG. 7 is an output image before and after a hybrid half-toning method according to an embodiment of the present invention is applied.

As shown in FIG. 6, when error diffusion applied to output a text and dithering applied to output a flat portion are combined, an output image on which a process for enhancing a boundary area is not performed is shown in (a) of FIG. 7, whereas an output image on which the enhancing process is performed is shown in (b) of FIG. 7.

It may be seen that raggedness at the boundary area of the text shown in (b) of FIG. 7 is smaller than raggedness at the boundary area of the text shown in (a) of FIG. 7. In order to reduce the raggedness, it is necessary to determine an amount of enhancement at the boundary area first. Hereinafter, items to be enhanced at a boundary area and a method of determining an amount of enhancement will be described in detail.

Figure 8:
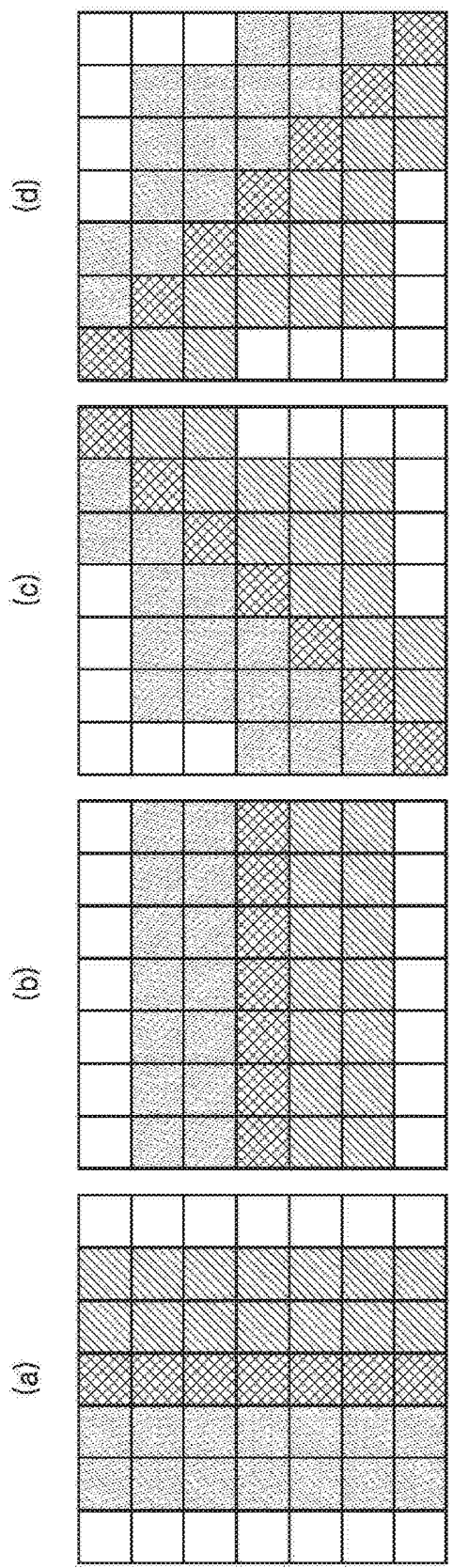
FIG. 8 is a diagram showing a method of determining a direction of a boundary according to an embodiment of the present invention.

FIG. 8 is a diagram showing a method of determining the direction of a boundary according to an embodiment of the present invention.

As shown in (a) through (d) of FIG. 8, image data may have various directions. As shown in (a) and (b) of FIG. 8, image data may have directions of 90 degrees and 0 degrees. Alternatively, as shown in (c) and (d) of FIG. 8, image data may have directions of 45 degrees or 135 degrees The control unit may determine the direction at the boundary area. Here, the direction is not relevant to a starting point and an ending point. The direction of a boundary area may be determined by combining a horizontal direction, a vertical direction, or a diagonal direction. Since it is difficult to determine the direction of the entire image data, the control unit may determine the direction regarding a specific area within image data. An area of image data may be defined as an area of N×N (where N is an integer) to determine the direction at the corresponding area.

The control unit may determine a dominant color at a boundary area. A dominant color refers to a basic color of a color combination, and the control unit may determine a dominant color using the following equation.

$$\text{Dominant Color} = \min\{\text{argC, avbM, avgY, argK}\} \quad \text{[Equation 1]}$$

As described in Equation 1 above, the smallest value of values in a CMYK color space may be determined as a dominant color. Here, the CMYK color space refers to a color space including color combinations of cyan (C), magenta (M), yellow (Y), and black (K). The control unit may determine a color corresponding to the smallest average value in the CMYK color space as a dominant color. The function Min{} is a function for selecting the smallest value from among variables, and avg denotes an average value. Therefore, the smallest value from among average values of colors of C, M, Y, and K may be determined as a dominant color.

Figure 9:
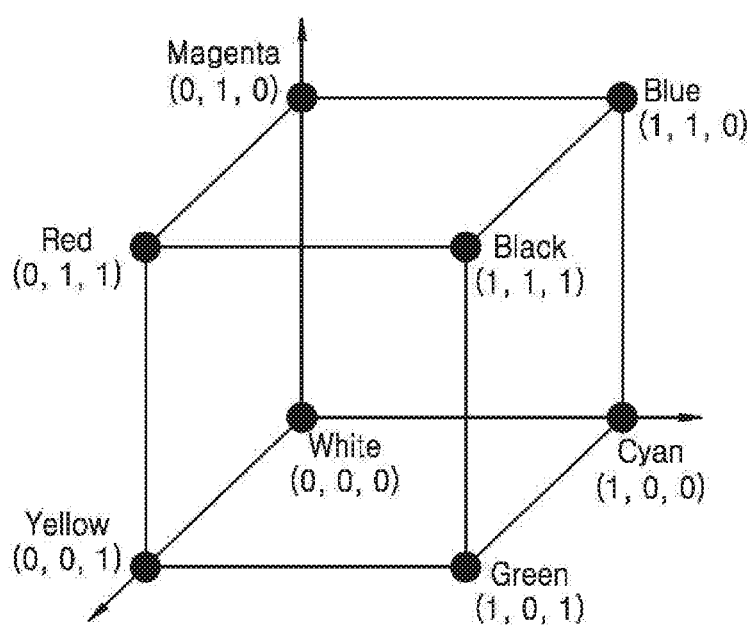
FIG. 9 is a diagram showing a CMYK color space according to an embodiment of the present invention.

FIG. 9 is a diagram showing a CMYK color space according to an embodiment of the present invention.

As shown in FIG. 9, various colors may be combined in a color space generated by combining four colors of cyan, magenta, yellow, and black. Values of various colors may be defined based on three mutually-orthogonal axes of cyan, magenta, and yellow, by using white as a reference value of (0, 0, 0). For example, in the case of green, it may be defined as a value of (1, 0, 1) in the CMYK color space.

Generally, since red, yellow, and blue are referred to as the three primary colors, a color space including the three primary colors may be defined. However, in the case of an image forming apparatus like a printer, the principle of color composition according to combinations of general three primary colors may differ. A color is expressed in an image forming apparatus as respective primary colors are embodied in half-tone dots and a mixture of colors thereof are seen by human eyes as a mixture of colors. Therefore, it may be advantageous for composing colors in the CYMK color space.

Furthermore, an image forming apparatus uses color defined in the CMYK color space instead of colors of the RGB color space. In the case of the RGB color space, various colors are defined by using colors of red, green, and blue as respective axes. However, in the case of the RGB color space, when all three colors are mixed, the brightest white color is formed. Therefore, the RGB color space is advantageous to form a mixed color of light. In the case of printing with an image forming apparatus, colors cannot be expressed by light, and thus the colors of the RGB color space are not used and the colors of the CMYK color space are used.

Figure 10:
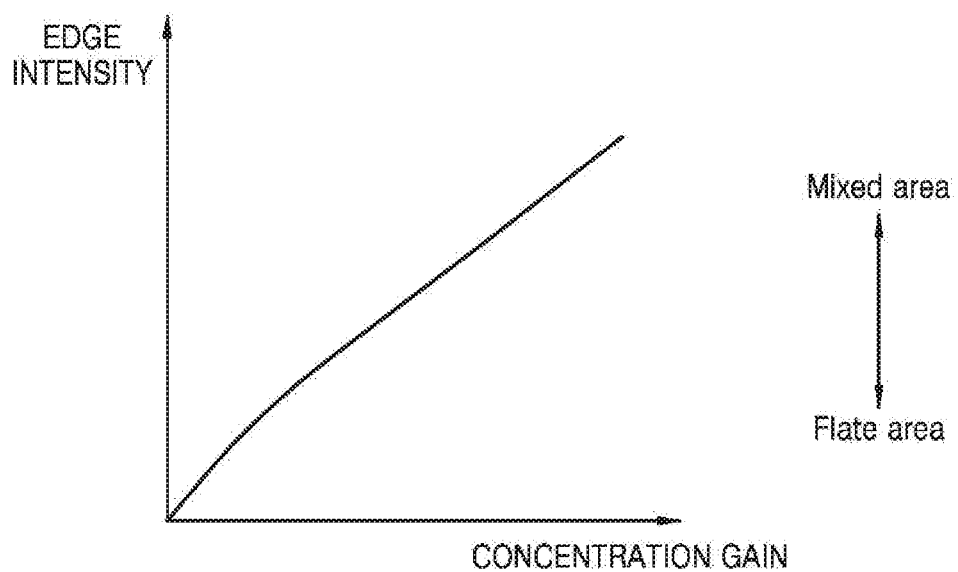
FIG. 10 is a graph showing edge intensities based on concentrations according to an embodiment of the present invention.

FIG. 10 is a graph showing edge intensities based on concentrations according to an embodiment of the present invention.

A control unit may determine an edge intensity as enhancement information regarding a boundary area. The edge intensity is a parameter for determining the clarity of an image and may be determined according to the following equation.

$$\text{Edge Intensity} = \text{abs}(\Sigma x1 - \Sigma x2) \quad \text{[Equation 2]}$$

(x1 denotes a gradation 810 of an area indicated by a first color in FIG. 8, and x2 denotes a gradation 830 of an area indicated by a second color in FIG. 8)

As shown in Equation 2, the edge intensity may be determined as the absolute value of a tone difference between a sum of tone values of the first color and a sum of tone values of the second color.

As shown in FIG. 10, the edge intensity at a boundary area is in a relationship proportional to a concentration value, which is enhancement information. As the concentration increases, the edge intensity value gradually increases, and high edge intensity in an area may mean that various elements are mixed within the corresponding area. On the contrary, when the edge intensity is low in an area, the corresponding area may be a flat image area. Hereinafter, a method of adjusting concentration will be described as a method of enhancing a boundary area of an output image by applying enhancement information to the boundary area.

Figure 11:
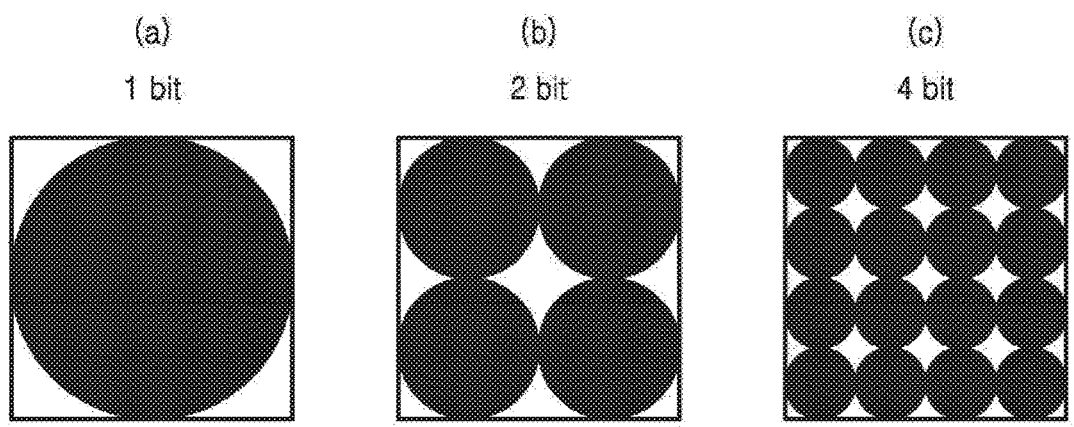
FIG. 11 is a diagram showing a method of adjusting concentration according to an embodiment of the present invention.

FIG. 11 is a diagram showing a method of adjusting concentration according to an embodiment of the present invention.

In a printing apparatus like a printer, halftone dots may be used to adjust concentration. A halftone dot refers to a smallest unit area during formation of an image. For example, in the case of ink printing, a halftone dot refers to the smallest unit area for applying ink. Such halftone dots are used to represent image data including shades and, when the number of halftone dots is changed within a certain area, white space is generated according to the adjusted number of halftone dots. Therefore, a shade may be adjusted according to a ratio between a black space and a white space.

A halftone dot ratio decreases as gradations with respect to the cyan, magenta, yellow, and black colors used in an image forming apparatus decrease, thereby indicating that the number of halftone dots is relatively small.

As shown in (a) through (c) of FIG. 11, the concentration may be expressed differently by changing the number of halftone dots. The concentration may be expressed in various bits, e.g., 1 bit as shown in (a) of FIG. 11, 2 bits as shown in (b) of FIG. 11, and 4 bits as shown in (c) of FIG. 11. The concentrations in the respective cases may be different from one another. The concentration of (b) of FIG. 11 may be higher than that of (a) of FIG. 11, and the concentration of (c) of FIG. 11 may be higher than that of (b) of FIG. 11.

Embodiment 1

Figure 12:
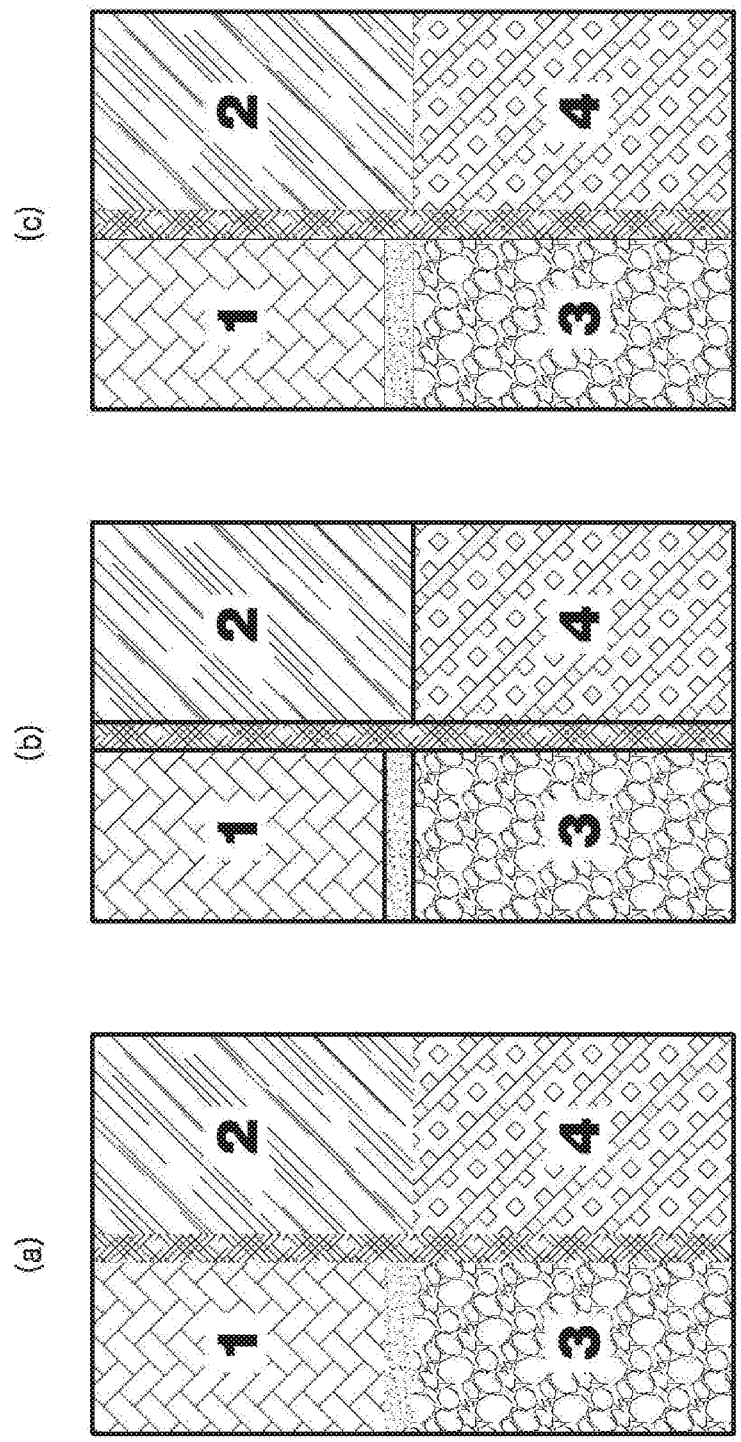
FIG. 12 is an output image before and after a hybrid half-toning method according to an embodiment of the present invention is applied.

FIG. 12 is an output image before and after a hybrid half-toning method according to an embodiment of the present invention is applied.

As shown in (a) of FIG. 12, image data may be roughly classified into areas of 1 through 4. It should be noted that the texts 1 through 4 in FIG. 12 are texts not included in the image data and are merely arbitrarily designated numbers for convenience of explanation of the present disclosure. It may be seen that a step or raggedness occurs at boundary areas where the respective areas 1 through 4 intersect one another in (a) of FIG. 12.

In (b) of FIG. 12, it may be seen that a line-like image is additionally inserted based on enhancement information with respect to each boundary area. In the case of (b) of FIG. 12, it may be seen that each of boundary areas between the areas 1 through 4 becomes clearer than the boundary areas of (a) of FIG. 12. In order to insert an additional line, it is necessary to first determine a direction at a boundary area. Furthermore, it is necessary to determine a dominant color and edge intensity at a boundary area, where the processes may be performed according to the above-described Equations 1 and 2.

As shown in (c) of FIG. 12, the concentration of a line inserted to a boundary area may be adjusted. It may be seen that the concentration of the boundary area in (c) of FIG. 12 is similar to the concentrations of nearby areas as compared to the boundary area in (b) of FIG. 12. It may also be seen that raggedness at the boundary area in (c) of FIG. 12 is significantly reduced as compared to that in (a) of FIG. 12. During determination of the concentration of a boundary area, the number of bits may be adjusted, such that the concentration of the boundary area becomes similar to the concentrations of nearby areas.

Embodiment 2

Figure 13:
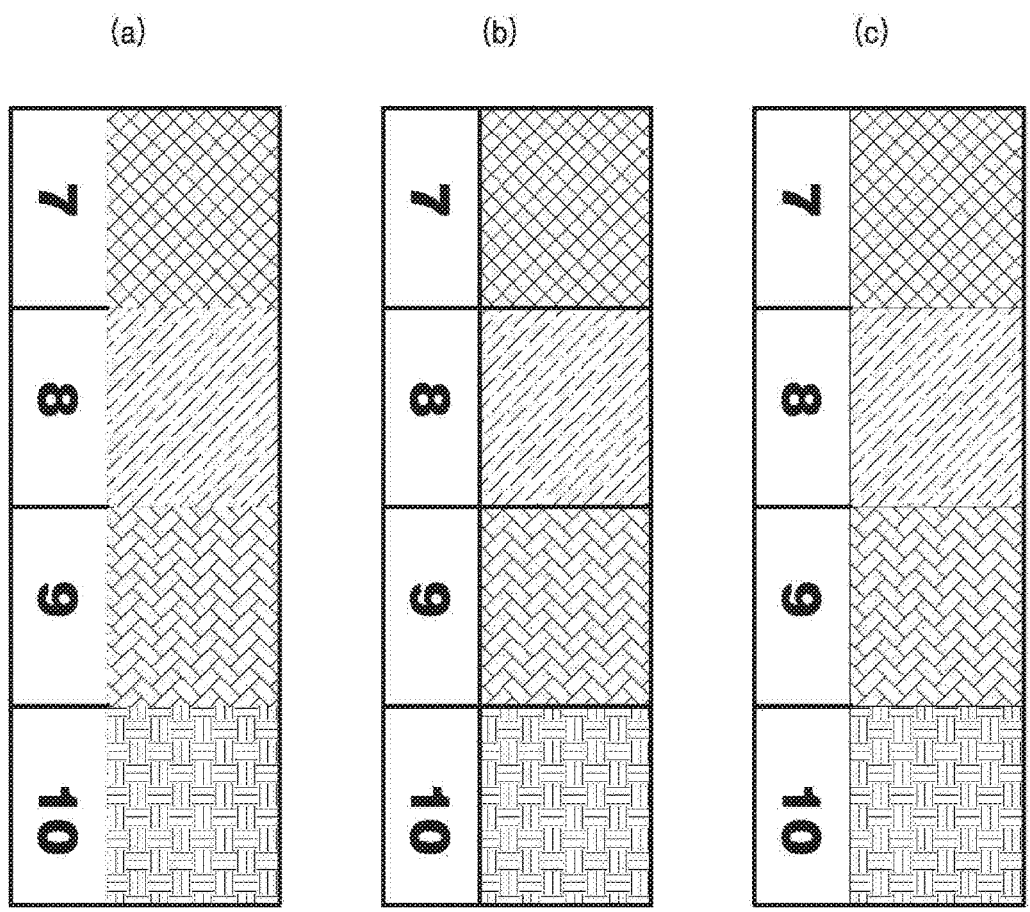
FIG. 13 is an output image before and after a hybrid half-toning method according to an embodiment of the present invention is applied.

FIG. 13 is an output image before and after a hybrid half-toning method according to an embodiment of the present invention is applied.

As shown in (a) of FIG. 13, there may be image data including an area where a text is output and an area where no text is output. It may be seen that a step or raggedness occurs at a boundary area where the area where a text is shown intersects the area where no text is shown in (a) of FIG. 13.

In (b) of FIG. 13, a line-like image is additionally inserted based on enhancement information with respect to each boundary area. It may be seen that the boundary area of (b) of FIG. 13 is clearer than the boundary area of (a) of FIG. 13. In order to insert an additional line, it is necessary to first determine a direction at a boundary area. Furthermore, it is necessary to determine a dominant color and an edge intensity at a boundary area, where the processes may be performed according to the above-described Equations 1 and 2.

As shown in (c) of FIG. 13, the concentration of a line inserted to a boundary area may be adjusted. It may be seen that the concentration of the boundary area in (c) of FIG. 13 is similar to the concentrations of nearby areas as compared to the boundary area in (b) of FIG. 13. It may also be seen that raggedness at the boundary area in (c) of FIG. 13 is significantly reduced as compared to that in (a) of FIG. 13. During determination of the concentration of a boundary area, the number of bits may be adjusted, such that the concentration of the boundary area becomes similar to the concentrations of nearby areas.

Figure 14:
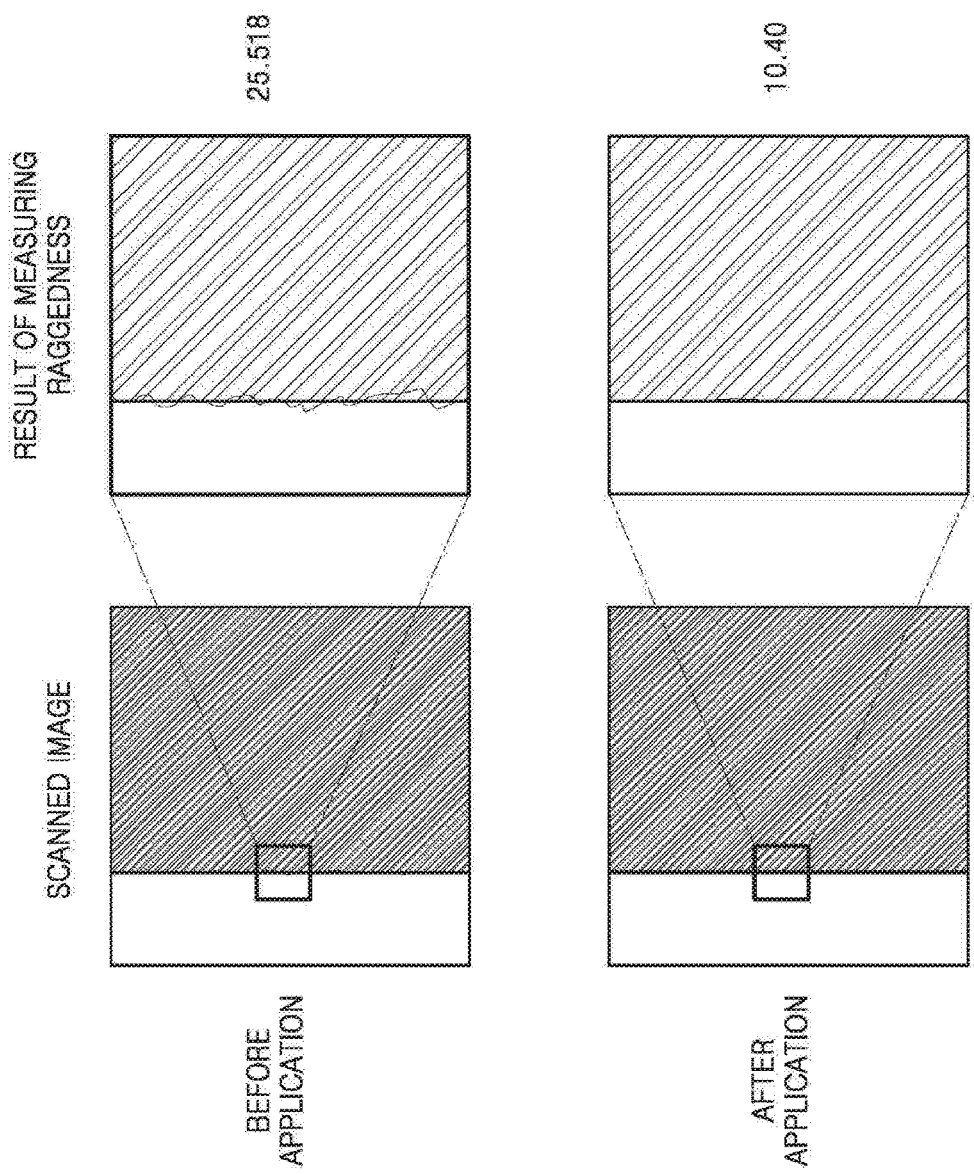
FIG. 14 is a diagram showing measured values of raggedness before and after a hybrid half-toning method according to an embodiment of the present invention is applied.

FIG. 14 is a diagram showing measured values of raggedness before and after a hybrid half-toning method according to an embodiment of the present invention is applied.

Although a reduction in raggedness may be visually recognized, by measuring values of raggedness, values before and after a process for enhancing a boundary area may be more clearly proved.

It has been confirmed experimentally that, before an enhancing process according to the present disclosure is applied, raggedness at a boundary area of an area was 25.518. The raggedness value after the enhancing process was 10.40, showing that the raggedness value was reduced to a value less than half of the value before the enhancing process (as the raggedness value becomes smaller, a boundary area may be distinguished more clearly).

Figure 15:
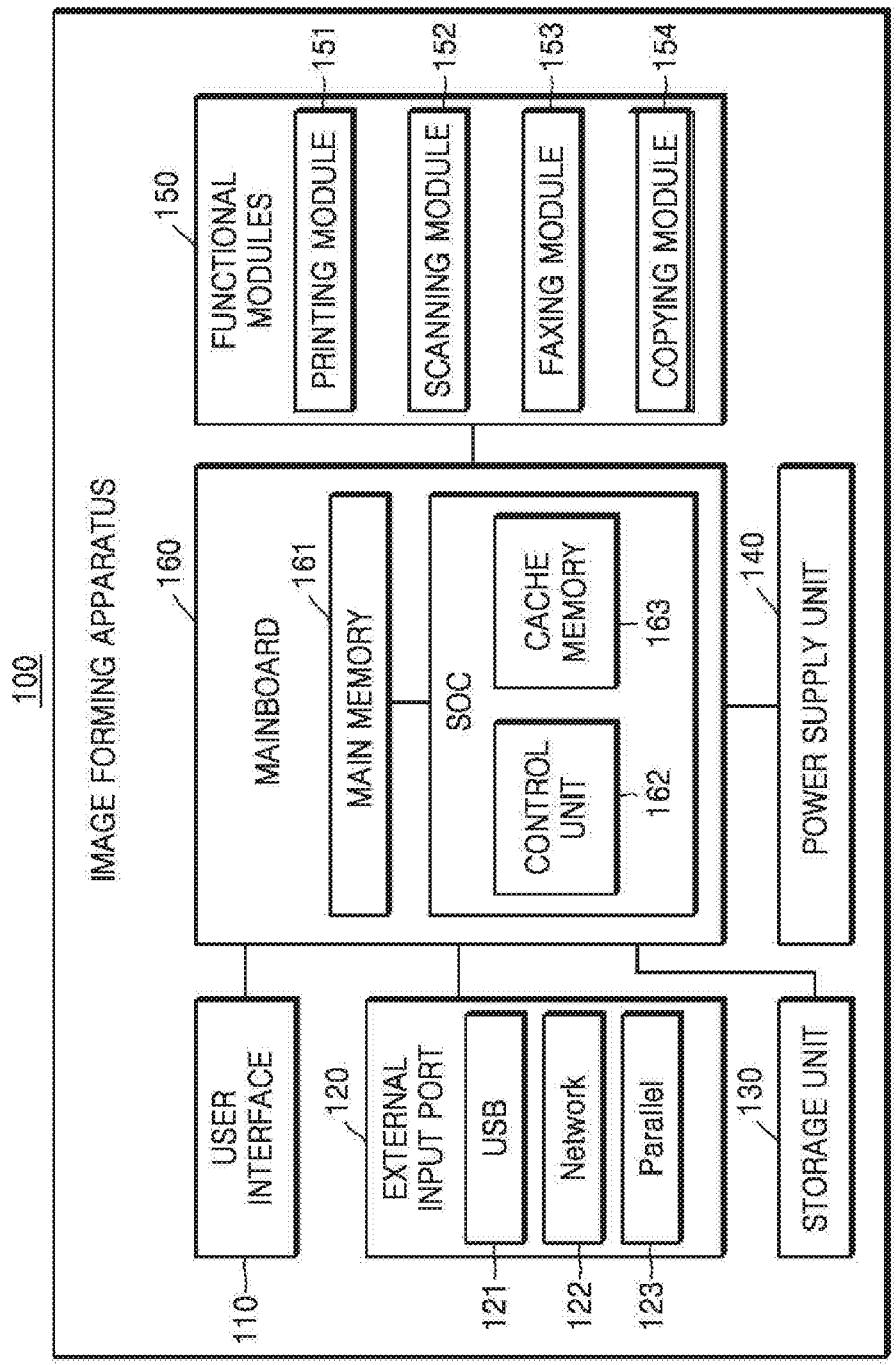
FIG. 15 is a diagram showing a structure of an image forming apparatus according to an embodiment of the present invention.

FIG. 15 is a diagram showing a structure of an image forming apparatus 100 according to an embodiment of the present invention. The image forming apparatus 100 is an apparatus for generating, printing, receiving, and transmitting image data. Typical examples of the image forming apparatus 100 may include a printer, a scanner, a copier, a fax, and a multifunction printer (MFP) including functions of the above-stated apparatuses.

Referring to FIG. 15, the image forming apparatus 100 includes a user interface 110, an external input port 120, a storage unit 130, a power supply unit 140, functional modules 150, 160, a main memory 161, a control unit 162, and a cache memory 163.

The user interface 110 receives a manipulation from a user and displays a result of the manipulation to the user. The user interface 110 may include a user input key for receiving a manipulation from a user. The user input key may be implemented as a physical button or on a touch screen. The user interface 110 may include a display unit (not shown) for displaying a result of a manipulation to a user. The display unit (not shown) may be implemented as a touch screen including a function as a user input key.

The external input port 120 transmits/receives data to/from an external input device (not shown). Typical examples of the external input device (not shown) may include a host computer, a mobile terminal, a digital camera, and a removable disk. Data received through the external input port 120 may include print job data, user authentication information, authentication information regarding an external input device, commands regarding maintenance and management of the image forming apparatus 100, and basic device setting values regarding the image forming apparatus 100.

Print job data refers to data describing jobs of the image forming apparatus 100, such as copying, faxing, scanning, and printing, in a print job language (PJL). Therefore, the print job data is not necessarily limited to data for printing an image on a printing medium. When a user authentication function or an external input device authentication function is set to the image forming apparatus 100, the image forming apparatus 100 may receive a user ID and a password for user authentication or receive a device identifier for external input device authentication through the external input port 120. The user authentication information and the external input device authentication information may be described in the PJL and included in print job data.

The external input port 120 may include at least one of a universal serial bus (USB) port 121, a network interface port 122, and a parallel port 123. When the external input port 120 includes the network interface port 122, the network interface port 122 may use the TCP protocol for data transmission through a network. The image forming apparatus 100 is connected to a network through the network interface port 122 and an IP address is assigned to the image forming apparatus 100. At this time, the image forming apparatus 100 may perform various functions, such as a network printing, an Internet fax, an e-mail transmission, and a web browsing, based on the IP address.

Meanwhile, the USB port 121 and the network interface port 122 of the external input port 120 may support not only wired connections, but also wireless connections. For example, the external input port 120 may include a wireless USB (WUSB) port or a wireless LAN interface port.

The storage unit 130 stores data received or generated by the image forming apparatus 100. When the image forming apparatus 100 has a document box function for storing files separately for respective users, the storage unit 130 provides storages for storing files to users. For example, a scanned image file, an original document file to be printed, an image file to be transmitted/received by fax, and print job data received through the external input port 120 may be stored in the storage unit 130.

The storage unit 130 may store user authentication information for user authentication. In other words, an ID and a password for user authentication may be stored in the storage unit 130. In addition to user authentication information, driver authentication information for authenticating a printer driver requesting printing, application authentication information for authenticating an application requesting printing, and device authentication information for authenticating a device requesting printing may be stored in the storage unit 130 according to authentication protocols of the image forming apparatus 100.

The storage unit 130 stores a main kernel for controlling operations of the image forming apparatus 100 in a normal mode P0 and a normal power-saving mode P1 and a micro kernel for controlling operations of the image forming apparatus 100 in an extreme power-saving mode P2. In the normal mode P0 or the normal power-saving mode P1, the main kernel stored in the storage unit 130 resides in the main memory 161 and controls operations of the image forming apparatus 100. In the extreme power saving mode P2, the micro kernel resides in the cache memory 163 and controls operations of the image forming apparatus 100.

The power supply unit 140 supplies power to the image forming apparatus 100 according to an instruction from the control unit 162. Depending on which of the normal mode P0, the normal power-saving mode P1, and the extreme power-saving mode P2 the image forming apparatus 100 operates in, the power supply unit 140 may supply power to different hardware resources. For example, in the extreme power-saving mode P2, the power supply unit 140 may block power supply to the storage unit 130, the functional modules 150, and the main memory 161 according to an instruction of the control unit 162.

The functional modules 150 execute functions provided by the image forming apparatus 100, such as a printing function, a scanning function, a faxing function, and a copying function. The functional modules 150 may include a printing module 151, a scanning module 152, a fax module 153 and a copy module 154. Although the embodiment of FIG. 15 is described under an assumption that the image forming apparatus 100 is a multifunction printer (MFP), when the image forming apparatus 100 executes only one function, some of the functional modules 150 may be omitted. For example, the scanning module 152, the fax module 153, and the copy module 154 may be omitted when the image forming apparatus 100 is a device that performs only a printing function.

The mainboard 160 provides a circuit for interconnecting the hardware resources of the above-described image forming apparatus 100 to one another. The main memory 161, the control unit 162, and the cache memory 163 are mounted on the mainboard 160. The main memory 161 is a large-capacity memory operating in the normal mode P0 or the normal power-saving mode P1, and a main kernel resides in the main memory 161 as described above. Furthermore, the main memory 161 provides a space required by the image forming apparatus 100 to read and write data for performing a predetermined job in the normal mode P0 or the normal power-saving mode P1. The main memory 161 may be implemented as a dynamic random access memory (DRAM). In the extreme power-saving mode P2, since power supply to the main memory 161 is stopped, the operation of the main kernel residing in the main memory 161 is also stopped.

The cache memory 163 stores a part of data of the main memory 161 in the normal mode P0 or the normal power saving mode P1, thereby enabling the control unit 162 to more efficiently access to the data stored in the main memory 161. The cache memory 163 may be implemented as a static random access memory (SRAM) having faster read/write speeds than those of the main memory 161. In the extreme power-saving mode P2, the cache memory 163 does not operate as a cache of the main memory 161, and the micro kernel resides therein.

The control unit 162 controls operations of the image forming apparatus 100 in the normal mode P0, the normal power-saving mode P1, and the extreme power-saving mode P2. The control unit 162 controls operations of the image forming apparatus 100 by executing the main kernel residing in the main memory 161 in the normal mode P0 and the normal power saving mode P1. The control unit 162 controls operations of the image forming apparatus 100 by executing the micro kernel residing in the cache memory 163 in the extreme power saving mode P2.

The control unit 162 controls the power supply unit 140, such that power is supplied to the external input port 120, the cache memory 163, and the control unit 162 even in the extreme power-saving mode P2. Since power is supplied to the external input port 120 even in the extreme power-saving mode P2, the external input port 120 may receive a wakeup event. The control unit 162 executes the microkernel residing in the cache memory 163, thereby processing a wakeup event received in the extreme power-saving mode P2. When the wake-up event received by the external input port 120 corresponds to reception of print job data, the control unit 162 maintains the extreme power-saving mode P2 and determines whether an authentication field value for performing an authentication exists in the print job data. When it is determined that no such authentication field value exists, the control unit 162 ignores the wake up event and continues to maintain the extreme power-saving mode P2.

The above-described embodiments of the present invention can be embodied as a program that can be executed in a computer and can be implemented on in a general-purpose digital computer that operates the program using a non-transitory computer-readable recording medium. In addition, the structure of the data used in the above-described embodiments of the present invention can be recorded on a non-transitory computer-readable recording medium through various means. The non-transitory computer-readable recording medium includes a storage medium such as a magnetic storage medium (e.g., ROM, floppy disk, hard disk, etc.), optical reading medium (e.g., CD-ROM, DVD, etc.), etc.

The present invention has been described above with reference to preferred embodiments thereof. It will be understood by one of ordinary skill in the art that the present invention may be embodied in various other forms without departing from the spirit or essential characteristics thereof. Therefore, the disclosed embodiments should be considered in an illustrative rather than a restrictive sense. The scope of the present invention is defined by the appended claims rather than by the foregoing description, and all differences within the scope of equivalents thereof should be construed as being included in the present invention.

The invention claimed is:

1. A method by which an image forming apparatus forms an image, the method comprising:
    detecting a boundary area in a portion of image data;
    determining a direction of the boundary area, a dominant color of the boundary area, and an edge intensity of the boundary area;
    determining enhancement information with respect to the boundary area based on the direction, the dominant color, and the edge intensity; and
    forming an image with respect to the image data based on the determined enhancement information,
    wherein error diffusion is applied to an area where text is displayed, and dithering is applied to an area where a background of the text is displayed.

2. The method of claim 1, wherein the boundary area is a boundary area between two areas to which different half-toning methods are applied.

3. The method of claim 1, wherein the direction of the boundary area is information expressible as a 2-dimensional vector in the portion of the image data.

4. The method of claim 1, wherein the dominant color of the boundary area is determined from information about one or more colors of the boundary area based on a pre-set equation.

5. The method of claim 1, wherein the edge intensity of the boundary area varies according to concentrations of the one or more colors of the boundary area.

6. The method of claim 1, wherein the boundary area is a boundary area between an error diffusion area and a screening area.

7. The method of claim 6, wherein the error diffusion area is an area for expressing detail information, and
    the screening area is an area for expressing information other than the detail information.

8. The method of claim 1, wherein the enhancement information with respect to the boundary area comprises at least one selected from the group of a color and a concentration of a line formed in the boundary area.

9. An image forming apparatus comprising:
    a network interface that receives data related to a user format document from outside;
    a memory that stores data regarding the received user format document;
    a control unit; and
    a printing module that prints the user format document based on determined enhancement information,
    wherein the control unit is configured to detect a boundary area in a portion of image data, determine a direction of the boundary area, a dominant color of the boundary area, and an edge intensity of the boundary area, and determine enhancement information with respect to the boundary area based on the direction, the dominant color, and the edge intensity, and
    wherein error diffusion is applied to an area where text is displayed, and dithering is applied to an area where a background of the text is displayed.

10. The image forming apparatus of claim 9, wherein the boundary area is a boundary area between two areas to which different half-toning methods are applied.

11. The image forming apparatus of claim 9, wherein the direction of the boundary area is information expressible as a 2-dimensional vector in the portion of the image data.

12. The image forming apparatus of claim 9, wherein the dominant color of the boundary area is determined from information about one or more colors of the boundary area based on a pre-set equation.

13. The image forming apparatus of claim 9, wherein the edge intensity of the boundary area varies according to concentrations of the one or more colors of the boundary area.

14. The image forming apparatus of claim 9, wherein the boundary area is a boundary area between an error diffusion area and a screening area.

15. The image forming apparatus of claim 9, wherein the enhancement information with respect to the boundary area comprises at least one selected from the group of a color and a concentration of a line formed in the boundary area.

* * * * *